(12) United States Patent
Han

(10) Patent No.: US 8,388,481 B2
(45) Date of Patent: Mar. 5, 2013

(54) SYSTEM AND METHOD FOR PROVIDING A CONSTANT OUTPUT FROM A VARIABLE FLOW INPUT

(75) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 13/384,621

(22) PCT Filed: Jul. 20, 2010

(86) PCT No.: PCT/US2010/042519
§ 371 (c)(1),
(2), (4) Date: Jan. 18, 2012

(87) PCT Pub. No.: WO2011/011358
PCT Pub. Date: Jan. 27, 2011

(65) Prior Publication Data
US 2012/0115662 A1   May 10, 2012

Related U.S. Application Data

(60) Provisional application No. 61/226,943, filed on Jul. 20, 2009.

(51) Int. Cl.
*B60K 17/06* (2006.01)
*F16H 3/70* (2006.01)
*F16H 1/32* (2006.01)
*H02K 7/10* (2006.01)
*H02K 7/18* (2006.01)
*F02B 63/04* (2006.01)

(52) U.S. Cl. ......... 475/170; 475/172; 475/175; 290/1 C; 180/364; 180/368

(58) Field of Classification Search ............... 475/170, 475/172, 175; 290/1 C; 180/364, 368
See application file for complete search history.

(56) References Cited

U.S. PATENT DOCUMENTS

| | | | |
|---|---|---|---|
| 5,016,493 A | 5/1991 | Han | |
| 5,116,292 A * | 5/1992 | Han | 475/16 |
| 5,308,293 A * | 5/1994 | Han | 475/18 |
| 5,937,701 A | 8/1999 | Mimura | |
| 6,068,570 A * | 5/2000 | Han | 475/207 |
| 6,537,168 B1 * | 3/2003 | Han | 475/8 |
| 7,081,689 B2 * | 7/2006 | Tilscher et al. | 290/44 |
| 7,731,616 B2 * | 6/2010 | Han | 475/207 |
| 2007/0082779 A1 * | 4/2007 | Han | 475/325 |
| 2009/0118043 A1 | 5/2009 | Eitan et al. | |

OTHER PUBLICATIONS

International Preliminary Report on Patentability, PCT/US2010/042519, Feb. 2, 2012, five pages.

* cited by examiner

*Primary Examiner* — Tisha Lewis
(74) *Attorney, Agent, or Firm* — Cameron LLP

(57) ABSTRACT

A system and method for providing a constant output from a variable flow input comprises a liquid flow energy input, for example, air or water for driving a constant speed generator. An inner and outer cam assembly is controlled by a control input to achieve varying eccentricity and control the output speed at an output shaft to be constant despite a varying rotational velocity input at an input shaft. A feedback control may be provided between one of the input shaft and the output shaft and the inner and outer cam assembly to maintain constant output by varying the eccentricity. The constant output may drive a constant speed generator having an infinitely variable torque generator. In this manner, a power grid may be provided with constant frequency alternating current at, for example, 50 Hz (Europe) or 60 Hz (USA). Also, a pair of non-circular gears, for example, a square gear and a clover-leaf gear may be used to reduce ripples in rotational velocity measured at the output shaft for a four OWCB constant output, variable flow input system.

23 Claims, 11 Drawing Sheets

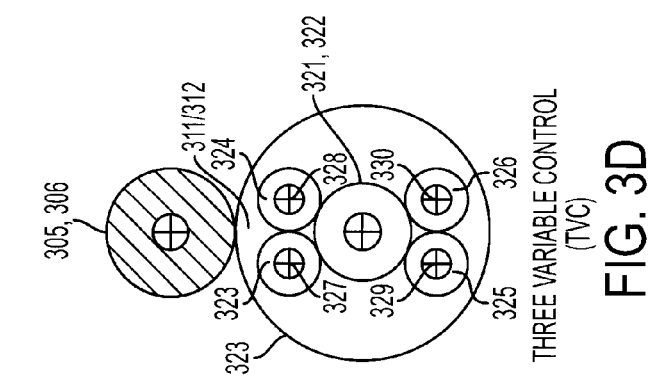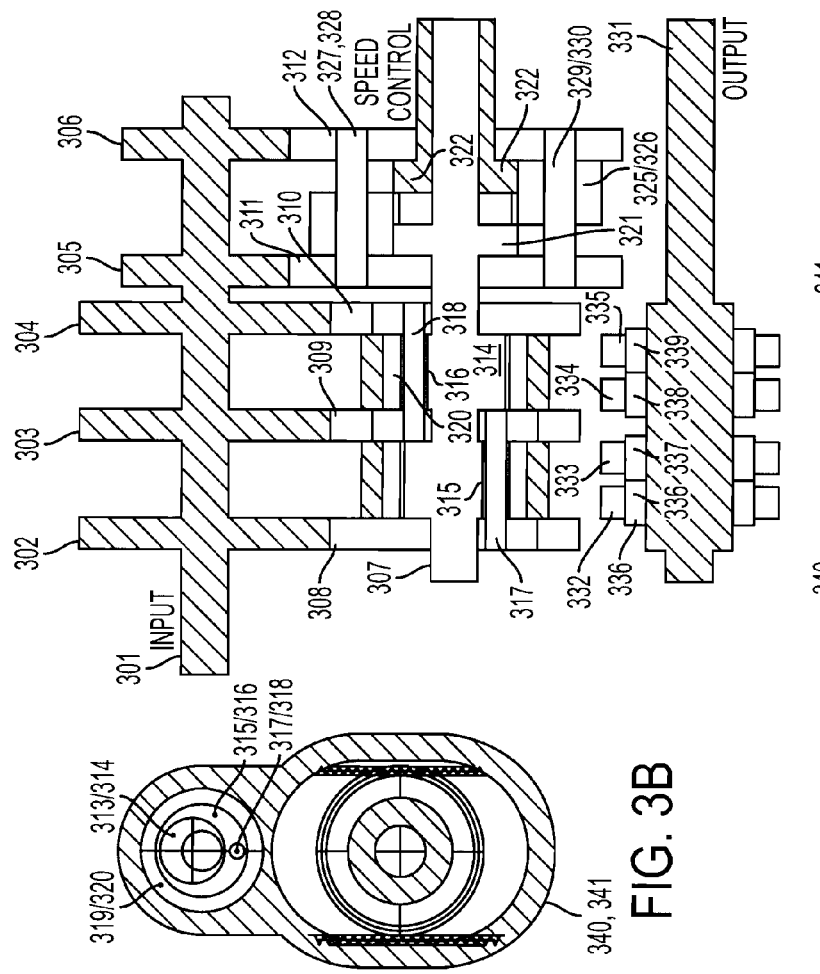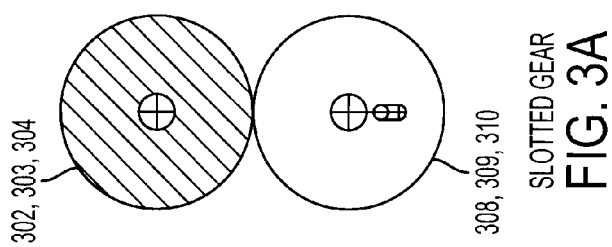

332-339 OWCB OPERATION

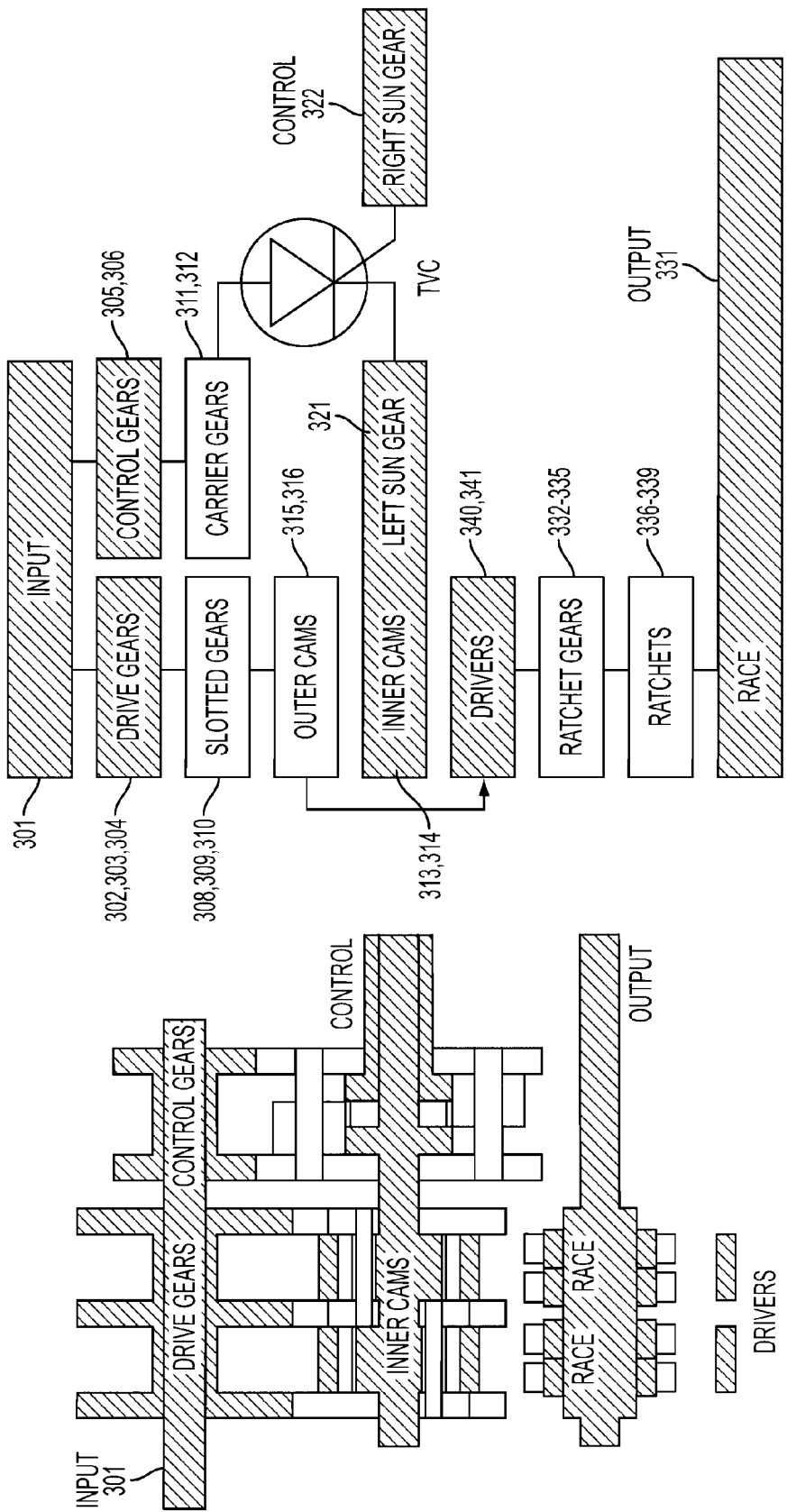

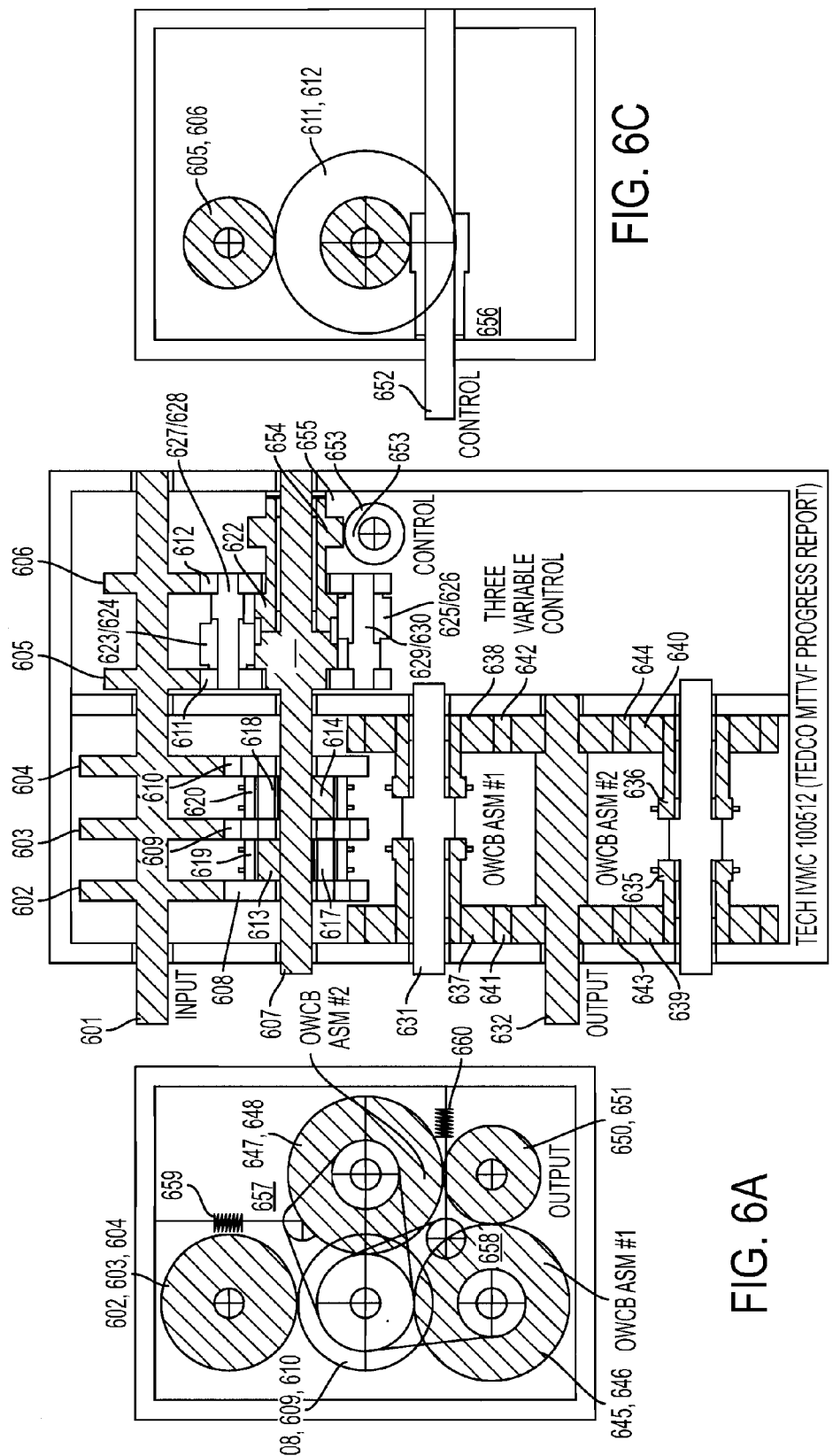

SYSTEM AND METHOD FOR PROVIDING A CONSTANT OUTPUT FROM A VARIABLE FLOW INPUT

This application is a 35 U.S.C. §371 national stage entry of international application PCT US2010/042519 filed Jul. 20, 2010, which claims priority to provisional U.S. Application Ser. No. 61/226,943 filed Jul. 20, 2009, the entire disclosures of which are hereby incorporated by reference into the present application as to their entire contents.

TECHNICAL FIELD

The technical field of the several embodiments of a system and method for providing a constant output from a variable flow input relate generally to the field of generating electrical energy in a clean manner, for example, from wind and water energy and, more particularly, to embodiments thereof wherein, for example, a variable input to constant output control apparatus is configured to receive a variable rotational velocity input and convert variable output velocity as input to a constant rotational velocity electricity generator for providing, for example, 50 Hz (Europe) or 60 Hz (USA) electric power directly to a grid.

BACKGROUND

It is now more common to find wind turbine farms as one tours the United States. For example, large wind energy farms are located in the United States in Texas, Indiana and California. Wind energy farms are now found world-wide from Spain to Australia and are providing an increasing percentage of the world's energy requirements. Sizes of structures supporting wind turbines have evolved from, for example, 0.15 MW sized wind turbines with blades having approximately a 26 foot (approximately eight meter) diameter to 5 MW generators having rotor blades of over 100 meters in diameter. A typical wind turbine is shown in FIG. 1 and will now be discussed in some detail.

A wind turbine for mounting on a sufficiently high tower is shown in FIG. 1 as turbine 100. A variable speed rotor 105 may turn a gearbox 108 (lower block diagram), 112 (black and white drawing) to increase the rotational velocity output of the rotor and blade assembly 105, 107, 109. For example, a so-called cut-in rotational velocity of a rotor 105 may be about six revolutions per minute and the rotor blade may typically cut-out at about 30 revolutions per minute by controlling the pitch of the rotor via pitch system 107 during conditions of high wind velocity and to reduce rotor blade noise. Typically, wind speeds over 3 meters/sec are required to cause the large rotor blades to turn at the cut-in rotational velocity. Wind frequency between cut-in and cut-out velocities has been measured to vary depending on location, weather patterns and the like. Placement high on a hill or a mountain of a wind turbine, for example, may be preferable to locating the wind turbine at a low point in a valley. Consequently, it may be recognized that there are periods of time when wind turbines 100 do not have sufficient wind speed to operate at all depending on weather conditions, placement and the like.

When wind speed reaches an excess amount, a pitch (and yaw) control system 107 may measure the wind speed and adjust pitch of rotor blades 105 to pass more wind and so control the rotor blade from turning too fast as well as point the rotor blade into the wind. Yaw control may supplement pitch control to assist in pointing a rotor into the direction of flow. Noise from rapid rotor velocity can be abated, for example, by turning the blade parallel to the wind using a wind speed control system to thus maintain the rotational velocity close to a cut-out speed. An anemometer 180 at the tail of the turbine 100 measures wind velocity and provides a control input. The tail of the turbine may be equipped with a rudder or wind vane for pitch or yaw control. Horizontal or vertical stabilizers (not shown) maybe provided for pitch or yaw control. The rudder or wind vane may help point the variable speed rotor 105 into the wind. In general, however, there is a problem with known wind turbine systems that only a portion of the wind energy available at a site of a wind turbine farm may be harnessed resulting in harnessing only a portion of the kinetic energy of the available wind to feed a power grid.

Referring again to FIG. 1, the gearbox 108, 112 may multiply the cut-in rotor output of six RPM, for example, by fifty yielding 300 RPM (more or less) for turning a variable speed generator 110, 114. A variable speed generator 110 (block diagram), 114 (black and white line drawing) may be used to convert the varying rotational speed of a main shaft (shown to the left of the man) to a variable power alternating current 122 for input to a power converter called a variable frequency converter 120 (VFC 120). In so doing, the variable frequency alternating current power 122 may be converted to direct current 124 and then to irregularly switched alternating current power 126. The conversion from variable frequency to direct current to constant frequency introduces inefficiency in converting flow energy to useable electric energy and so reduces an amount of power that could be output to grid 130.

VFC 120 converts variable power alternating current 122 produced by variable speed generator 110 to direct current DC 124, to irregular switched alternating current 126. The irregular switched alternating power 126 is acceptable for outputting to grid 130 of constant power alternating current at constant frequency 128 but is inefficiently produced. The cost to replace known variable frequency converters (power converters) 120 is, for example, between $50,000 and $100,000 and, consequently, an alternative design has been sought for the conventional wind turbine 100 of FIG. 1.

A gearbox 108, 112 is known to have a failure rate of approximately 5%. Electronics used in a wind turbine 100 has the highest potential failure rate of 26%. Control units generally exhibit a failure rate of 11%. Sensors and yaw control exhibit approximately a 10% failure rate. The failure rate of VFC 120 may be on the order of 26% (electronics) according to an ongoing consortium's study of drive train dynamics at the University of Strathclyde, Glasgow, Scotland. The mean time between failures may be only two years on average; and the replacement cost may be over $50,000 (US) per converter. A failure rate of the generator 110, 114 is on the order of 4.5%. Consequently, problems related to known wind turbines relate closely to the failure rate of gearboxes, generators, variable frequency converters and associated electronics and inefficiencies of operation.

A solution to the identified problems is to provide a constant rotational velocity as an input to the electric generator so that the generator in turn can produce a constant output at constant frequency directly to grid 130. Transmissions have been developed or are under development by the following entities: IQWind, Fallbrook and Voith Wind (Voith Turbo) to provide a constant output from a variable input. U.S. Pat. No. 7,081,689, (the '689 patent) assigned to Voith Turbo of Germany is exemplary of an overall system control design providing three levels of generator control. Voith provides a so-called power split gear and a hydrodynamic Fottinger speed converter or transformer adapted to be connected between a rotor and gear assembly and a synchronous generator for outputting power to a grid, for example, at 50 Hz (European). As discussed at col. 2, lines 60-67, "The invention is based on the object of providing a control system for a wind power plant, which allows the operation of a speed-constant, mains-coupled generator in conjunction with an efficiency-optimized speed guidance of the wind rotor for the partial load range." A further control system is provided for "speed reduction for noise limitation and for full load operation." As shown in FIG. 1, the wind speed and rotor revolution speed are sensed as inputs to control several operating states: power generation, synchronization, braking, load shedding and voltage drop. In particular, a controller is provided for controlling rotor blade angle, a controller is provided for determining the speed of the generator via an input to the hydrodynamic converter, and the synchronous generator is controlled according to requirements from the electric grid, voltage, frequency, power and reactive power.

The '689 patent provides considerable guidance into the variable factors influencing wind turbine behavior and how to control them. FIG. 3, for example, provides a graph of cut-in and cut-out revolution speed of a rotor versus rotor power in kW and rotor torque. In particular, FIG. 3 shows a set of solid line curves for power taken up by a wind rotor at wind speeds between 8 m/s and 18 m/s. It further shows broken line curves for how a synchronous generator may provide torque in a range between 10 kNm to 35 kNm depending on torque characteristics and associated parabolics. The respective power maxima are situated on a parabolics (power) curve. FIG. 4 shows power in kW, revolution speed of the rotor and speeds in the hydrodynamic drive train. FIG. 5 shows related power, optimal revolution speed and how to set the reaction member for the hydrodynamic drive train. FIG. 7 provides a ten minute (600 second) wind profile where the average wind speed is 11 m/s and the turbulence intensity is at 17.2%. The wind velocity can vary from 6 to 15 m/s, the rotor torque can vary from 0 to $2\times10^6$ N/m when a brake cuts in. The torque on the main shaft can reach a level of $16\times10^6$ when the revolution speed of the rotor may be stopped. The rotor blade angle may vary over time and the reaction member controlled accordingly.

A problem with the Voith system represented by the '689 patent is its use of hydraulics and resultant potential toxicity. Moreover, it appears to be inefficient compared with other known systems.

IQWind of Israel is represented by U.S. Patent Application Publication No. 2009/0118043 published May 7, 2009. A variable dynamic gear is shown and described for use in power generators, per paragraph [0004], "where it may be preferable to maintain a constant output speed despite variations in the power of a source of mechanical power being harnessed." A pair of cones are described which provide the variable dynamic gear—in one embodiment with a stepped surface and in another embodiment with a smooth surface. While described as dynamic and variable, it is respectfully submitted that IQWind provides a fixed number of speeds and may be inefficient and expensive to maintain and install. IQ Wind may rely considerably on electronic control which may result in a high failure rate.

Fallbrook Technologies of San Diego, Calif. provides a continuously variable transmission as disclosed, for example, in US Patent Application Publication No; 2008/0132373 published Jun. 5, 2008. According to the ABSTRACT, an infinite number of speed combinations are provided. Nevertheless, the transmission depicted in FIG. 1 appears to be unscalable whereby a plurality of speed adjusting balls are utilized to adjust speed between input and output. Thus, it is respectfully submitted that the Fallbrook solution appears to be unscalable and may be expensive to install and maintain.

While IQWind, Fallbrook and Voith appear to provide a constant output from a varying input, the described transmissions appear to relate closely to wind flow and do not provide discussion of the problem of other liquids such as water flow from, for example, river, ocean tidal and wave motion. Gutsfeld, U.S. Pat. No. 4,104,536, provides an example of a stream or river-powered turbine with radially-extending vanes, reminiscent of the paddle wheels of stone mills of the nineteenth century. Rauch, U.S. Pat. No. 4,524,285, provides an example of a hydro-current energy converter. Conical members direct the water flow to a rotor and the whole device May be mounted to the sea floor via a tripod. Ruiz et al., U.S. Pat. No 5,834,853, describes a sea or river powered power plant having a ratchet-type turbine. Waves and currents strike the lower portions thereof to turn a shaft of a generator. Szpur, U.S. Pat. No. 5,946,909, describes a floating, turbine system whereby a plurality of turbine rotors operate in series connection across a span of water from shore to a fixed location in the water to operate a land-based generator. Carillo, U.S. Pat. No. 6,396,162, describes an underground hydroelectric plant which uses an underground water tank connected to several penstocks, which, in turn, carry the water to generators for generating electricity. Rembert, U.S. Pat. No. 6,861,766; describes a hydro-electric power system that further includes a wind turbine. Rembert thus considers the use of both water pumped to a height and wind for generating electric power. Mondl, U.S. Pat. No. 7,442,002, describes a tidal turbine installation chained to the river floor but permitted to float and generate electric power from the water current flowing through the device. Mondl describes a problem at high water of floating debris, not considered by Szpur, which, it is respectfully submitted, may catch floating debris.

Water is considerably more dense than air and requires less of a flow speed to generate appreciable electric current flow. On the other hand, similar problems as are found in wind turbine present themselves with water flow turbines. The rotor blade or radial vane must be controlled, for example, to face the current. Ideally, it is known that water flows fastest at the center of a stream, a creek, a tidal area, a wave and the like. An ocean wave proximate a beach has unique characteristics of high velocity movement as the wave crashes and strong undercurrents as the wave retreats from the shore. There is maintained a requirement for a variable input constant output regardless of water flow application where water has the advantage of increased density. Consequently, there is no need for, for example, 100 meter diameter rotor blades to capture the kenetic flow energy.

While harnessing of wind and water and other flow energy enhances a clean environment, there remains a need in the art to extend the concept of variable input and constant output to provide a flow energy system that promotes greater efficiency with higher energy output, at lower cost and at lower failure rate.

Each of the above-identified patents and published patent applications should be deemed to be incorporated by reference herein as to their entire contents.

Summary of Embodiments and Aspects

This summary is intended to introduce, in simplified form, a selection of concepts that are further described in the Detailed Description and depicted in the drawings. This summary is not intended to identify key or essential features of the claimed subject matter, nor is it intended to be used as an aid in determining the scope of claimed subject matter. Embodiments and aspects described herein relate generally to embodiments and aspects and methods of use of a variable input, constant output embodiment described in prior U.S. Pat. Nos. 5,016,493; 5,116,292; 5,169,359; 5,308,293; 6,068, 570; 6,537,168; 7,462,124; 7,731,616 and 7,731,619 of the same inventor incorporated herein by reference as to their entire contents. The later disclosed embodiments of these patents may be described as variable motion control embodiments, and these patents are incorporated by reference as to their entire contents. The patents support the presently described structure in the form of a variable speed gearing assembly, transmission and control device and method for providing a constant output from a flow energy source or infinitely variable motion control device (IVMC).

Embodiments described herein adapt prior related disclosed apparatus for flow energy. Flow energy may comprise, for example, liquid flow, i.e. air, water or other liquids of varying density. An infinitely variable motion control (IVMC) device of an embodiment typically comprises an input, a control and an output. In a flow energy system, the input is variable and the output speed is desired to be controlled at a constant by the control. An input shaft, for example, from a turning rotor of a fluid drive or gearbox connected to the fluid drive turns drive gears and control gears of the embodiment at variable speed. The drive gears may comprise slotted gears, in particular, dual action drivers with rack gears, for rotating inner and outer cam assemblies including a cam shaft connected to a left sun gear of the controller. The left sun gear is coupled by planetary gears to carrier gears. As introduced above, the control gears are also connected to the input shaft for providing a control input via the carrier gears to a right sun gear where the left sun gear is connected to the cam shaft. The right sun gear (or carrier gears) provides a control input for controlling the variable input at the input shaft to be a constant output at an output shaft.

Continuing the description of the driving gears and cams, the cam assemblies now provide a controlled drive in one direction as follows. One-way clutch bearings are bearings embedded inside one-way clutch bearing gears with bores. As an output shaft attempts to reverse direction, the OWCB (ratchet) gears catch a ratchet race portion of the output shaft from moving in a reverse direction without moving the housing. Thus, the one-way clutch bearing gears cause an output shaft to rotate in one direction and prevent operation in the other direction of rotation, a form of mechanical rectification of a sinusoidal output. Providing multiple OWCBs select a fastest speed to consolidate multiple outputs produced by the cams and cam followers to one output.

As will be described further herein, the inner and outer cams comprise an assembly such that in a concentric position, the inner cam shaft is concentric with the outer circumference of the outer cam. There are an infinite number of angular positions of the inner and outer cams between a concentric position and a maximum eccentric position. In a maximum eccentric position, the center of the cam shaft is displaced from the outer cam circumference at a maximum distance. According to the angular position of the right sun gear which is adjusted such that the outer cam is at an eccentric, angular position value with respect to the inner cam and the center of the cam shaft, the output speed may be controlled to be any speed between a minimum and a maximum speed. Because there are an infinite number of eccentricity levels between concentric and a maximum eccentric position, by adjusting the right sun gear or worm and worm gear in an alternative embodiment, a variable input from a flow energy source may be adjusted to control an output to be a constant output.

In one embodiment, a gearbox provides speed increasing gears to the speed of revolution of a rotor shaft driven by flow energy to achieve, for example, a pre-determined output speed that is fifty times the input speed. For example, if the input cut-in speed of a rotor is six rpm and may be 30 rpm at a maximum, the output speed determined by the gearbox is 300 to 1500 rpm when the gearbox factor is fifty. The gearbox typically multiplies the speed, by a predetermined value or factor, for example, 50 times. Following the variable input, constant output logic above, the minimum value of 300 rpm at the output of the gearbox and input to the present apparatus may be reduced, for example, by 20% or to $\frac{1}{5}$ of the 300 rpm input by setting the eccentricity of the cam gears at a maximum or 300 rpm×0.2 equals 60 rpm. Referring briefly to FIG. 3, the desired output speed may be set to be 20% of the input. This value of output may be increased, for example, for input to a typical constant speed generator. This embodiment, then, increases and controls the output throughout the process.

For example, one way clutch bearing (OWCB) gears, as will be described further herein, may be reduced, for example, in diameter by one half. Halving the diameter doubles the speed from 60 rpm to 120 rpm. Ratio increasing gears set at 2 and 6.25, or 12.5 total, increase the speed from 120 rpm to 1500 rpm. The right sun gear is used to change the eccentricity such that 1500 rpm is maintained as the constant output to a typical constant speed generator of a flow energy electric generator power system. For example, as an eccentricity factor decreases from a maximum toward a more concentric inner/outer cam position, the constant rotational output of 1500 rpm may be maintained with increasing input speed. Consequently, a variable input and constant output flow energy system is provided, for example, by replacing the variable speed generator 110 of FIG. 1 with a variable speed to constant speed converter 230 for providing constant power alternating current 130 to a grid via constant speed generator 250 of FIG. 2. Known rotor pitch control, as described above, may be used in situations of excessive flow input far reducing noise in a wind system or torque on a shaft, for example, in extreme flow conditions along with yaw and other known controls.

In an alternative embodiment, the speed increasing gears of a gearbox 108, 112 may, for example, multiply the speed by fifty as before. The embodiment of variable speed to constant speed converter 200 of an infinitely variable generator 200 may be modified to incorporate sprockets and chains which replace the drivers with rack gears as will be described with reference to FIG. 6 herein. This embodiment increases the speed throughout the process as follows. In this embodiment, for example, the typical minimum value of 300 rpm from the rotor and gearbox system will be increased by 20% while the eccentricity of the inner and outer cams are at a maximum resulting in a speed of 360 rpm (1.2×300 rpm). In a similar manner as before, the one way clutch bearing (OWCB) sprocket diameter may be halved to increase the speed by two and so result in a speed of 720 rpm. Adding ratio increasing gears by 2 may yield an output speed of 1400 rpm. Adjusting the diameter of these gears, the factor may be, for example, 2.0833 and so result in an output speed of 1500 rpm. As introduced above by Voith, 1500 rpm is a representative drive for a 50 Hz (Europe) electric power generator. The gearing ratios may be varied, for example, to achieve a different speed, for example, 1200 or 1800 for 60 Hz (USA) depending on the input speed provided by the gearbox 108, 112, the operating speed of the constant speed generator 250 and the requirements of constant power alternating current 130 (FIG. 2).

One embodiment comprises a tachometer coupled to the input shaft (or to the output shaft). The tachometer output value is then input to a microprocessor having a decision table stored in memory. Depending on the value output of the tachometer and the value of eccentricity, for example, represented as an angular rotation position of an inner cam provided by the look-up table, an actuator may control the right sun gear (or worm and worm gear) to deliver constant speed from a variable speed input in either of the embodiments described above.

A problem discussed by Voith is that of variable torque delivered to a rotor shaft because of varying wind speed and rotor speed which may become so severe as to require shut down or braking of input to a generator. While pitch control indirectly may relieve the torque on a rotor shaft, in one embodiment of a flow generator system, according to one embodiment, an axially slideable stator may be slid from a distant position to be in immediate proximity to the rotor to deliver maximum torque to a rotor shaft or removed axially from being proximate to the rotor to one or the other side of the rotor so as to minimize the electromagnetic field and the torque on the rotor shaft to fall below a predetermined torque value and thus controlled without having to shut down or brake the generator.

The output delivered by an embodiment of the present system as described above may be sinusoidal. For example, a typical output of the outer cam and output shaft may be sinusoidal and require rectification. As an alternative to electrical rectification, in one embodiment, mechanical rectification is achieved. One-way clutch bearing sprockets with embedded OWCBs (ratchets) cause output shaft motion together with the housing for a ball bearing or roller pin or other wedging means that wedges the bearing or rolling pin against the housing. By using a plurality of OWCBs, together, these select the fastest output so that the output to the race or the output shaft may consolidate multiple outputs to one output.

Ripple reduction is accomplished for the rectified, sinusoidal output, as will be described herein, by using a pair of approximately n-sided, non-circular gears, for example in the form of n-sided gears (for example, triangular for a three OWCB embodiment or four-sided for a four OWCB embodiment as shown in FIGS. 3 and 6) and n-leafed gears (a three-leaf clover or a four leaf cloverleaf gear) coupled to the cams depending on the number n of OWCBs. For example, the embodiments depicted in FIGS. 4, 9 and 10 of U.S. Pat. No. 7,731,616 are three OWCB embodiments and thus a triangular and three leaf cloverleaf gear may be used with those embodiments. These ripple reduction gears introduce a counterbalancing input and shape the output independent of the magnitude of the eccentricity provided by the control input. Consequently, ripple reduction as an input and output of the constant speed generator may be achieved without adversely impacting the eccentricity control aspects described above. The ripple reduction is thus accomplished as follows. When the properly matched rippled compensation input is synchronized with the cam positions, the ripples compensate the input so that constant output can be generated at all speeds. The input is the same but the amount of compensation varies as the eccentricity varies. Thus, the compensating gears do not impact the setting of eccentricity value; eccentricity and ripple compensation work together to smooth the output.

These and other embodiments and aspects will now be described with reference to the drawings and the detailed description to follow.

BRIEF DESCRIPTION OF THE DRAWINGS

FIG. 3 shows a detail view of an infinitely variable motion control system for a fluid flow controlled turbine as per the example of the wind turbine of FIG. 1 whereby a three variable control means (lower portion of FIG. 3D) is provided for controlling the variable input to achieve a constant output in accordance with the principles of FIG. 2 wherein FIG. 3C is a cross-sectional view of the variable input, constant output apparatus; FIG. 3A is a front view of drive gears and slotted gears; FIG. 3B is a front view of a driver including inner and outer cam and cam pin assemblies; and FIG. 3D shows control gears and three variable control (TVC).

FIG. 5 provides a logic diagram per FIG. 5B for the control of the apparatus of FIG. 5A which logic diagram is applicable to the system embodiment of FIG. 3 and FIG. 6.

FIG. 6 depicts an alternative embodiment of a variable input, constant output flow energy system using sprockets and chains. In particular, FIG. 6 depicts a customized embodiment producing a minimum output which is the same as the input and a maximum output which is 20% more than the input such that with feedback control per FIG. 7, a constant output is produced wherein FIG. 6B is a cross-sectional view; FIG. 6A in a front view showing the use of sprockets and chains and FIG. 6C is a rear view showing the control features.

DETAILED DESCRIPTION OF THE EMBODIMENTS

Figure 1:
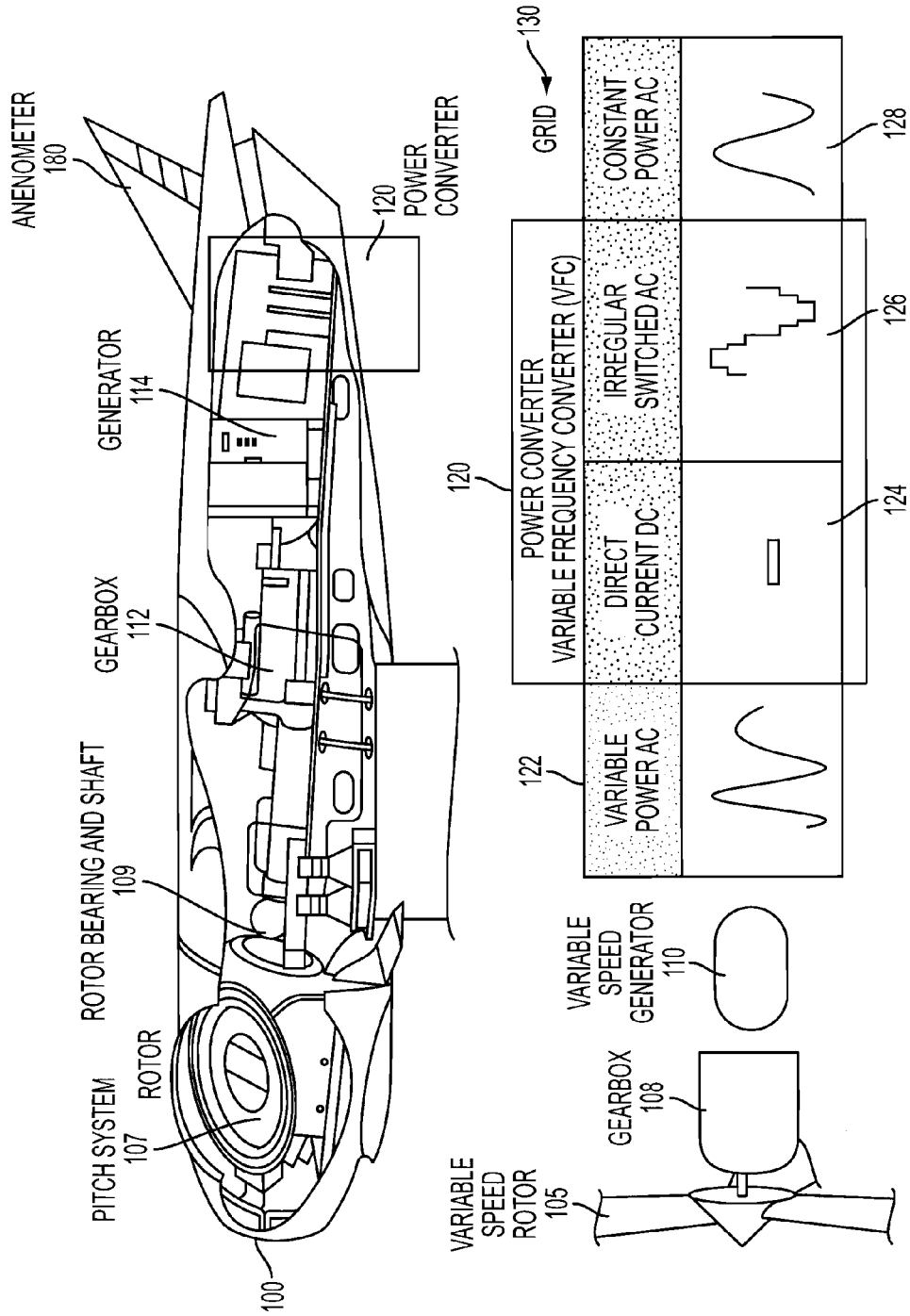
FIG. 1 shows an embodiment of a wind turbine 100 according to the prior art including a rotor, a gearbox, a generator and a variable frequency converter.

The figures, FIGS. 2-10 generally provide details of embodiments for receiving a variable input according to a flow of a liquid, such as air or water and providing a constant output at constant frequency to a power grid. Similar reference characters are used in the drawings to denote similar elements where the first number, for example, the number 3 in reference number 302 represents the first figure (FIG. 3A, 3C)) in which drive gear 302 first appears. In many drawings, a two digit reference numeral is shown without the introductory figure number in order to conserve space in the drawing.

Figure 2:
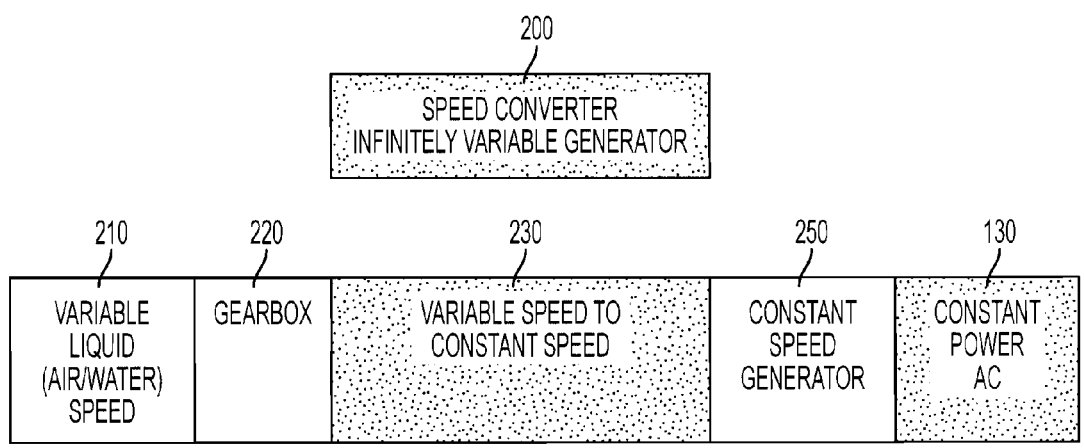
FIG. 2 provides an overall block diagram view of a desired variable speed to constant speed converter 230 so that, at the output of a constant speed generator 250, a constant alternating current (AC) power output to a grid 130, may be obtained at a constant frequency, for example, 50 Hz in Europe or 60 Hz in the United States.

Referring first, again, to FIG. 1, a variable frequency converter 124 and its inefficiencies for providing constant alternating current output to a power grid are overcome by providing a variable input, constant output speed converter shown as infinitely variable generator 200 in FIG. 2. As an input, a variable speed source of energy such as liquid energy, for example, air energy or water energy, 210 may turn an impeller blade, a propeller blade, a rotor blade or other blade assembly 105 of FIG. 1. Speeds of liquid flow may change in direction. Hence a tail with horizontal and vertical wings or other means may be provided to cause the rotor blades or other liquid energy collector to face into the direction of the liquid flow.

FIG. 2 provides an overall block diagram view of a desired variable speed to constant speed converter 230 so that, at the output of an electric generator 250, a constant alternating current (AC) power output 130 may be obtained at constant frequency, for example, 50 Hz in Europe or 60 Hz in the United States. In a fluid energy embodiment where the fluid, for example, is water, a gearbox 220 may be actuated by a rotor turned by water for capturing wave motion of the water, for example, a crashing wave versus an undertow or current or the current of a river. A gearbox 220 may typically multiply the variable input rotational velocity on an input shaft to provide a higher rotational velocity on an output shaft of the gearbox. In a river or stream where debris may be floating, a flow energy embodiment similar to the Rauch, U.S. Pat. No. 4,524,285 embodiment may be preferred whereby there is a sealed, conical secondary housing and water flow velocity may be increased to turn the rotor more rapidly and so promote maximum efficiency. As for air, the three tiered control system of Voith Turbo, per U.S. Pat. No. 7,081,689 may be preferred but may be improved upon by improving efficiency, eliminating hydraulics and decreasing costs. From gearbox 220, the typically increased variable input is directed to variable speed to constant speed converter 230 according to embodiments to be discussed with reference to FIGS. 3 and 6 to provide a constant output speed for driving a constant speed electric generator 250, for example, at 1500 rpm. As a result a constant power alternating current 130 may be provided to a power grid without conversion to direct current and back again.

FIG. 3 shows a detail view of an infinitely variable motion control (IVMC) system for a fluid flow controlled turbine as per the example of the wind turbine of FIG. 1 whereby a three variable control means (FIG. 3D) is provided for controlling the variable input to achieve a constant output in accordance with the principles of FIG. 2 wherein FIG. 3C is a cross-sectional, view of the variable input, constant output apparatus; FIG. 3A is a front view of drive gears and slotted gears; and FIG. 3B is a front view of drivers 340, 341 including inner and outer cam and cam pin assemblies. While no housing is shown in FIG. 3, a housing may be provided if appropriate, for example, to protect against rust and provide access for maintenance. An outer housing is shown for the embodiment of FIG. 6 but is not provided with a reference numeral. Referring again to FIG. 3, an input shaft 301 is integrally connected to drive gears 302, 303 and 304 seen in both FIG. 3A and FIG. 3C. The input shaft 301 may also be integrally connected to control gears 305, 306 seen in FIGS. 3C and 3D. The control gears may operate three variable control (TVC) for controlling the speed from a variable input speed at input shaft 301 to a cam assembly and output shaft 331 via drivers 340, 341 shown in FIG. 3B. The drivers 340, 341 comprises cam bearings 319, 320, inner cams 313, 314 and outer cams 315, 316 whereby cam pins 317, 318 are positioned in slotted gears 308, 309, 310. Drivers 340, 341 are elongated and slotted for cooperating with output races of output shaft 331. One-way clutch bearing gears 332-335 and OWCB's 336-339 are shown and their operation will be further described with reference to FIG. 4C. These are used to turn the output shaft 331 in one direction. The operation of one-way clutch bearings will be described further herein with reference to FIG. 4C. A cam shaft 307 is controlled to provide varying eccentricity of the outer cam in relation to the inner cam (resulting in varying distance between shaft and cam pin) in accordance with FIG. 4A as will be discussed further herein.

Referring to a control assembly of FIG. 3D (also seen in FIG. 3C), control gears 305, 306 may actuate TVC carrier gears 311, 312 which are coupled to a plurality of planetary gears 323, 324, 325, 326 and associated TVC pins 327, 328, 329, 330. TVC left sun gear 321 and right sun gear 322 will be further explained with reference to FIG. 4B. The right sun gear may provide TVC or may be optional such that the carrier gears 311, 312 provide TVC.

In particular, referring to FIG. 3A, drive gears 302, 303, 304 operate slotted gears 308, 309, 310 for the drivers 340, 341 of FIG. 3B. The drivers 340, 341 of FIG. 3B are cam followers; rather, the output cams and pins dictate how much output that the cam followers (drivers) should produce. Drivers 340, 341 move upwards and downwards, are capable of dual action and so are referred to herein as dual-action drivers. The right sun gear of three variable control (TVC) FIG. 3D controls the eccentricity value for delivering constant output for turning output shaft 331 in relation to the variable input speed of input shaft 301. A table of all components of FIG. 3 will now be provided:

| Reference character | Description |
| --- | --- |
| 301 | Input shaft |
| 302, 303, 304 | Drive Gears |
| 305, 306 | Control Gears |
| 307 | Cam and Control Shaft |
| 308, 309, 310 | Slotted Gears |
| 311, 312 | TVC Carrier Gears |
| 313, 314 | Inner Cams |
| 315, 316 | Outer Cams |
| 317, 318 | Cam Pins |
| 319, 320 | Cam Bearings |
| 321 | TVC Left Sun Gear |
| 322 | TVC Right Sun Gear |
| 323, 324, 325, 326 | Planetary Gears |
| 327, 328, 329, 330 | TVC Pins |

-continued

| Reference character | Description |
| --- | --- |
| 331 | Output Shaft |
| 332, 333, 334, 335 | OWCB Gears (ratchets) |
| 336, 337, 338, 339 | OWCB's (ratchets) |
| 340, 341 | Drivers |

Figure 4A:
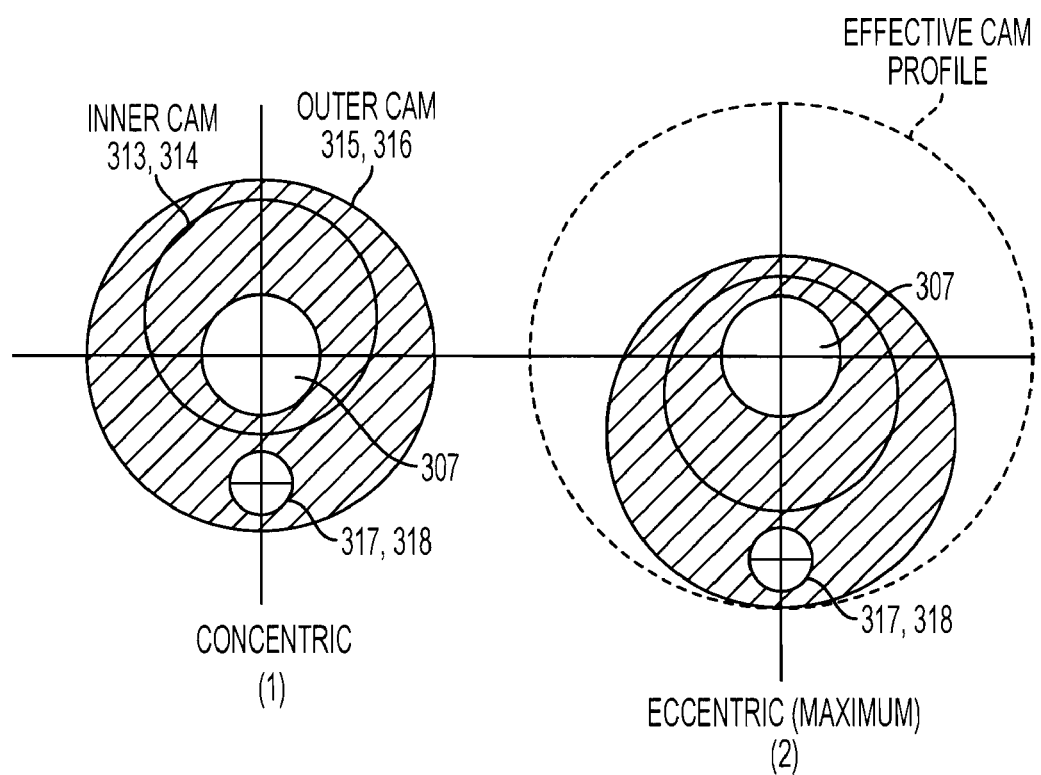
FIG. 4A shows details of an inner and outer cam and cam pin assembly useful in all embodiments including the embodiment of FIG. 3 depicting a level of eccentricity between concentric positioning (FIG. 4A(1)) of an inner and outer cam and eccentric positioning (FIG. 4A(2)) whereby maximum output speed is achieved at maximum eccentricity.

FIG. 4A shows details of an inner and outer cam assembly useful in all embodiments including the embodiment of FIG. 3 depicting a level of eccentricity between concentric positioning (FIG. 4A(1)) of an inner and outer cam, and eccentric positioning (FIG. 4A(2)) whereby maximum output speed is achieved at maximum eccentricity. Inner cams 313, 314 are attached/fixed on control shaft 307. The outer cam by movement of an associated inner cam can vary eccentricity in one of an infinite number of eccentric positions whereby cam pins 317 are nested in slots of slotted gears 308, 309, 310 and refrain outer cams 315, 316 from freely rotating around inner cams 313, 314 and keep a predetermined distance from control shaft 307 and so the effective cam profile may be increased from a minimum to a maximum. In this manner, a variable input may be controlled to provide a constant output of output shaft 331.

Figure 4B:
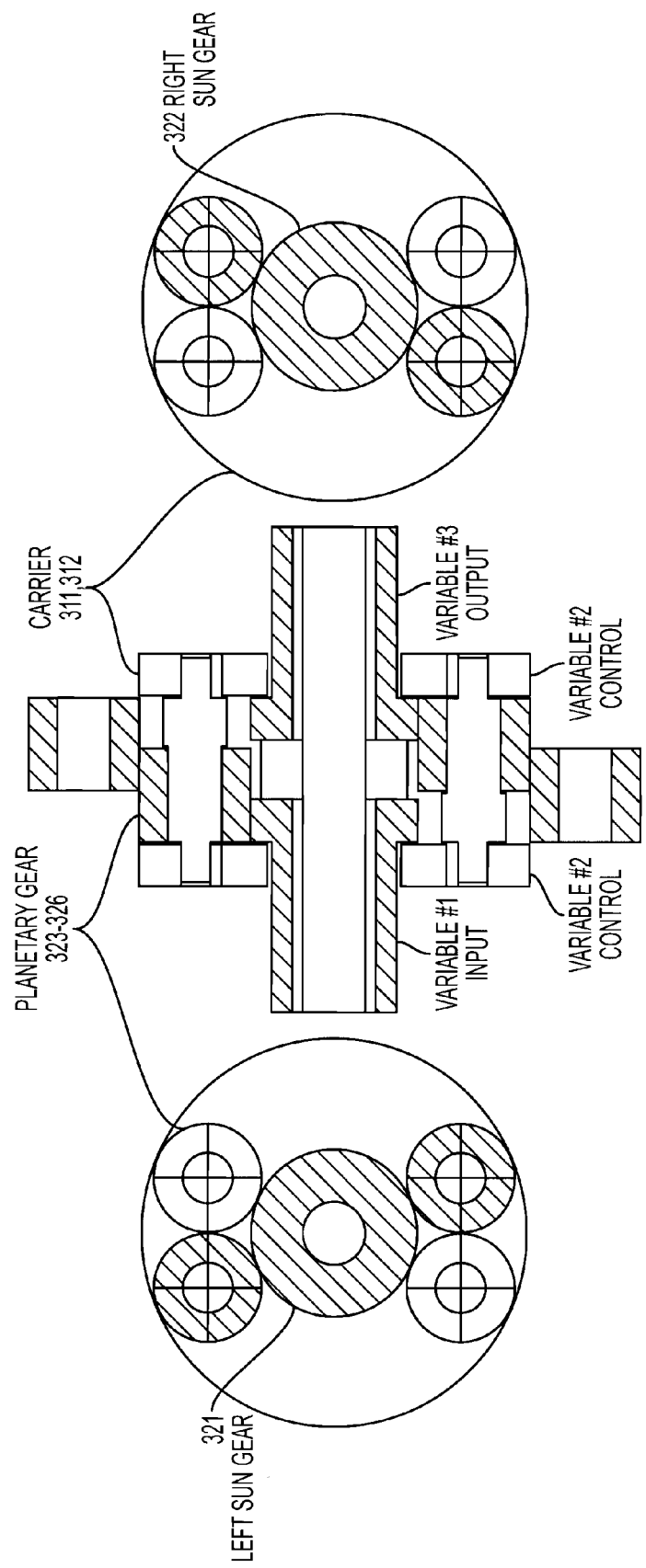
FIG. 4B provides details of a three variable control (TVC) system of FIG. 3D including a left sun gear, a plurality of planetary gears, carrier gears and a right (controlling) sun gear for controlling eccentricity according to FIG. 4A wherein the carrier gears may also provide the TVC control.

FIG. 4B provides details of a three variable control system of FIG. 3D including a left sun gear 321, planetary gears 323-326, carrier gears 311, 312 and a right (controlling) sun gear 322 for controlling eccentricity according to FIG. 4A. The three variables that are controlled are a first variable, the input, a second variable, a control input and a third variable, the output, which is desirably controlled to be a constant. In cooperation with the eccentricity of FIG. 4A, the right sun gear may be adjusted continuously with the variable input to achieve a constant output. One means for accomplishing a continuous control is via a feedback system which may be mechanical or electronic. An electronic feedback control system will be further described with reference to FIG. 7B.

Figure 4C:
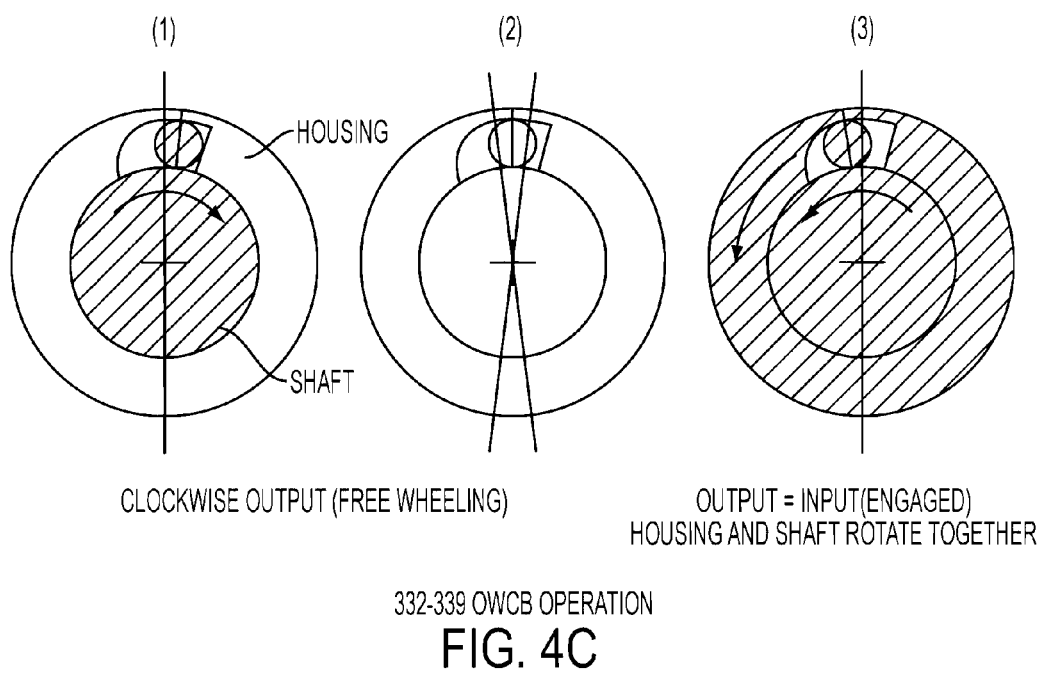
FIG. 4C provides details of a one-way clutch bearing (OWCB) wherein a ball bearing or roller pin is shown nested for assuring rotational motion in one direction whereby FIG. 4C(1) shows the race in free-wheeling clock-wise motion where the one-way clutch ball bearing or roller pin free and not wedging the housing and race while FIG. 4C(3) shows how counter-clockwise rotation is precluded by operation of the one-way clutch ball bearing or roller pin is wedged between the housing above and race below so that the OWCB housing and race rotate together when the ball, pin or other wedging means is wedged against the housing.

FIG. 4C provides details of a ratchet, referred to herein as a one-way clutch bearing (OWCB) for assuring rotational motion in one direction whereby FIG. 4C(1) shows freewheeling clockwise motion of a roller bill bearing or roller pin with relation to a housing FIG. 4C(2) shows a transitory position where the ball bearing and roller pin is midway between a wedges position and a free-wheeling position. FIG. 4C(3) shows a wedging operation of the one-way clutch ball bearing or roller pin or other wedging means so that the OWCB housing and race (shaft) rotate together when the roller pin or ball bearing is wedged against the housing.

FIG. 5 provides a logic diagram per FIG. 5B for the control of the apparatus of FIG. 5A which logic diagram is applicable to the system embodiment of FIG. 3 and FIG. 6. FIG. 5A closely resembles FIG. 3 cross-section and reference numerals used in FIG. 5B correspond. Input 301 simultaneously provides an input to drive gears 302, 303, 304 and to control gears 305, 306. Drive gears 302, 303, 304 operate slotted gears 308, 309, 310 which connect to outer cams 315, 316 via pins 317, 319. On the control side of FIG. 5B, control gears 305, 306 operate carrier gears 311, 312 which provide an input to TVC whereby right sun gear 322 sets an eccentricity via left sun gear 321 of inner cams 313, 314. In this manner, drivers 340, 341 are regulated to provide constant output from variable input on input shaft 301. The drivers 340, 341 turn output shaft or race and output 331 via OWCB gears 332-335 and one-way clutch bearings or ratchets 336-339.

Exemplary Embodiment No. 1

In this first exemplary embodiment, a gearbox 108, 112, 220 provides speed increasing gears to the speed of revolution of a rotor blade shaft to achieve, for example, a pre-determined output speed that may be a multiple of the input rotational velocity of a blade rotated by flow energy. For example, if the input speed of a rotor (for example, a propeller, impeller, vane or the like) is 6 rpm and may be 30 rpm at a maximum, the output speed determined by the gearbox 108, 112, 220 is 300 rpm minimum to 1500 maximum rpm (a variable input rotational velocity) or fifty times the rotor blade shaft rotational velocity. So 300 rpm, minimum, may be provided for driving the input shaft 301 of the embodiment of FIG. 3 to achieve 1500 rpm output and if 1500 rpm input is provided then the same 1500 rpm output is provided as controlled by the eccentricity.

Following the variable input, constant output logic above, the minimum value for input shaft 301 of 300 rpm may be reduced, for example, to 20% or ⅕ of the input by setting the eccentricity of the cam gears at a maximum or 300 rpm×0.2 equals 60 rpm. A one way clutch bearing (OWCB) gear and embedded bearing as described above and described further herein with reference to FIG. 6 may be reduced, for example, in diameter by ½ to double the speed from 60 rpm to 120 rpm. Ratio increasing gears set at 2 and 6.25, or 12.5 total, may further increase the speed from 120 rpm to 1500 rpm. The right sun gear 322 is used to change the eccentricity such that 1500 rpm is maintained as the constant output to the constant speed generator 250 of a flow energy electric generator power system regardless of a typical input speed ranging from 300 rpm to 1500 rpm. For example, as an eccentricity factor (or angle of inner cam to outer cam) decreases from a maximum toward a more concentric inner/outer cam position, the constant rotational output of 1500 rpm may be maintained with increasing input speed. Consequently, a variable input and constant output flow energy system is provided without having to use a variable speed generator 110 or a variable frequency converter 120. As suggested above, the ratios may be adjusted depending on input gearbox variable rotational velocity to achieve any constant rotational velocity output suitable, for example, for providing 50 Hz (European) or 60 Hz (USA) alternating current to a grid 130.

Known rotor pitch control 107, as described above, as well as known yaw control may be used in situations of excessive flow input for reducing noise in a wind system or torque on a shaft, for example, in extreme flow conditions. A further torque control system is introduced in conjunction with a discussion of FIG. 8.

FIG. 6 depicts an alternative embodiment of a variable input, constant output flow energy system using sprockets and chains wherein FIG. 6B is a cross-sectional view; FIG. 6A in a front view showing the use of sprockets and chains; and FIG. 6C is a rear view showing the control features. The embodiment of FIG. 6 may be easily retrofitted into a wind turbine system by eliminating the variable speed generator 110 and the power converter 120 and replacing them with a speed converter 200 (FIG. 2, 3, 6) and a constant speed generator 250. Reference characters 601 through 618 represent similar elements as those represented by reference characters 301 through 318. Also, reference numerals 621 through 630 represent similar elements as those represented by reference numerals 321 through 330. In particular, an input shaft 601 receives a variable rotational velocity input from a gearbox (not shown). Input shaft 601 is integrally connected to drive gears 602, 603 and 604 seen in both FIG. 6A and FIG. 6B. The input shaft 601 may also be integrally connected to control gears 605, 606 seen in FIGS. 6C and 6D. The control gears may operate three variable control (TVC) for controlling the speed from a variable input 601 to a cam assembly and output shaft 649 via a drive arrangement shown in FIG. 6A. The driver system comprises drive sprockets 619, 620, driven sprockets and race assemblies 633, 634, 635, 636 and chains 645, 646, 647 and 647 shown in FIGS. 6A and 6B. Tension spring 659 is provided in conjunction with tension sprocket 657 and tension spring 660 in conjunction with tension sprocket 658 to maintain chain tension. Thrust bearing and race 655 is shown in FIG. 6B while thrust bearing and race 656 is shown in control FIG. 6C. One-way clutch bearings 637-640 and gears 641-644, also referred to as ratchets are used to turn the output shaft 649 in one direction. Note that in this embodiment first and second one-way clutch bearing assemblies may be provided as shown as ASM #1 and #2. As will be described further herein with reference to FIG. 9, the number of OWCB's may determine a number n for the number of sides of non-circular gears for outputs ripple reduction. The operation of one-way clutch bearings has been described above with reference to FIG. 4C. A control shaft 652 is controlled to provide varying eccentricity of the cams in accordance with FIG. 4A as discussed above.

A table of all components of FIG. 6 which has been modified to incorporate a chain drive will now be provided:

| Reference Characters | Description |
| --- | --- |
| 601 through 618 | Same as 301 through 318 |
| 619, 620 | Drive Sprockets |
| 621 through 630 | Same as 301 through 330 |
| 631, 632 | One-Way Clutch Bearing (OWCB) Shafts |
| 633, 634, 635, 636 | Driven Sprockets and Race Assemblies |
| 637, 638, 639, 640 | OWCB's |
| 641, 642, 643, 644 | OWCB Gears |
| 652 | Control Shaft |
| 653 | Worm |
| 654 | Worm Gear |
| 655, 656 | Thrust Bearings and Races |
| 657, 658 | Tension Sprockets |
| 659, 660 | Tension Springs |

Exemplary Embodiment No. 2

The embodiment of FIG. 6. may be retrofitted without having to modify a gearbox. In this alternative embodiment, the variable speed generator 110 and power converter 120 may be eliminated and the embodiment modified to incorporate sprockets and chains which replace the drivers with rack gears. In this embodiment, for example, the minimum value of 300 rpm from the rotor system may be increased by 20% while the eccentricity of the controllable placement of the outer cams in relation to the fixed inner cams are at a maximum resulting in a speed of 360 rpm. (1.2×300). As in the first exemplary embodiment, the one way clutch bearing (OWCB) gear diameter may be halved to increase the speed by two and so result in a speed of 720 rpm. Adding ratio increasing gears by 2 would yield an output speed of 1400 rpm (but this may be less than a desired 1500 rpm speed for driving a generator). Adjusting the diameter of these gears, the factor may be 2.0833 and so result in an output speed of 1500 rpm. As introduced above, 1500 is a representative drive for a 50 Hz electric power generator. The gearing ratios may be varied, for example, to achieve a different speed, for example, 1200 or 1800 for 60 Hz depending on the operation of the synchronous, constant speed generator 250. As before, constant alternating current power may be output to a grid 130 at 50 Hz (European) or 60 Hz (USA).

Figure 7:
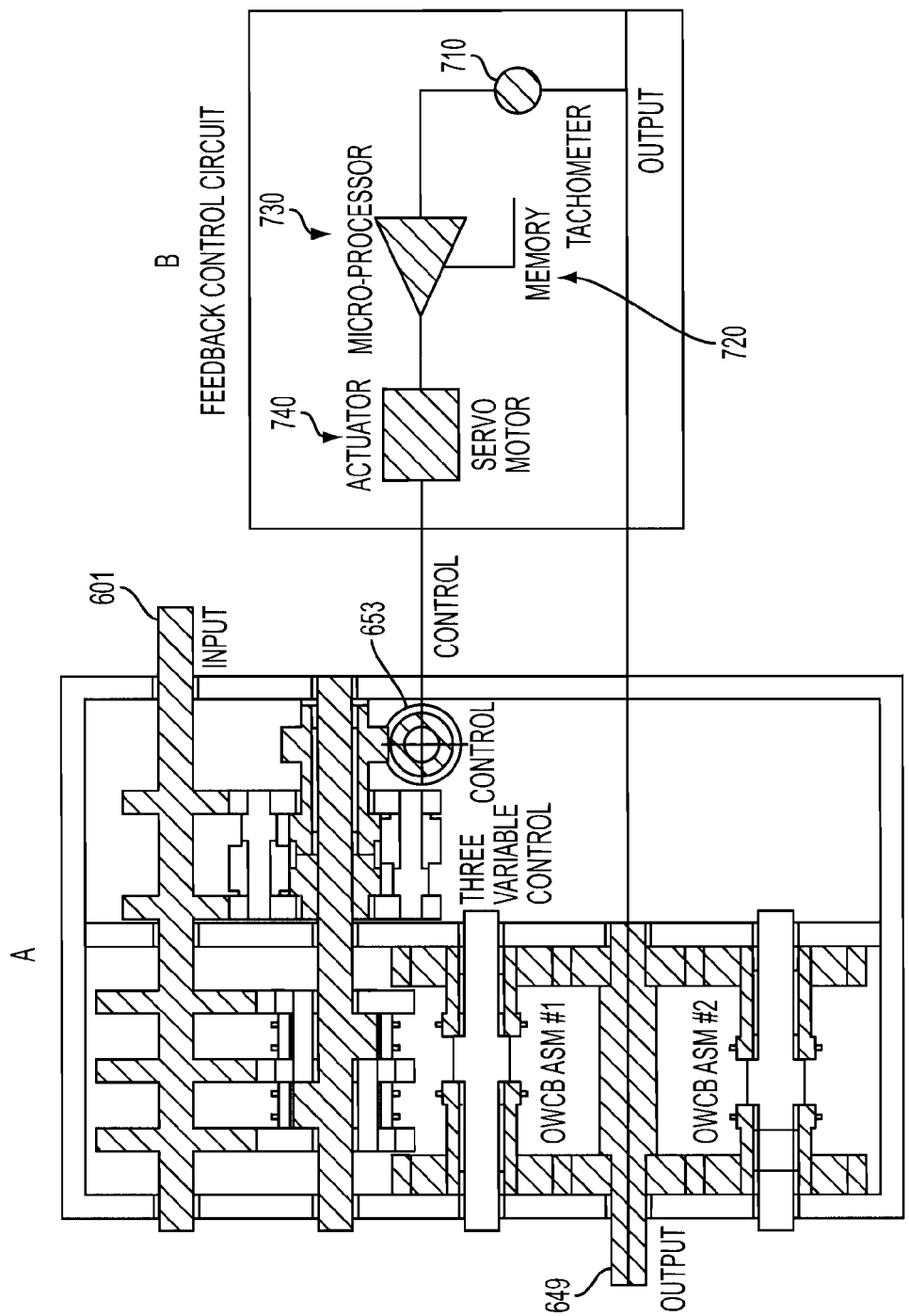
FIG. 7 depicts the embodiment of FIG. 6B as FIG. 7A and an adjunct feedback control circuit per FIG. 7B including a microprocessor and look-up table for controlling operation of the system of FIG. 7A to maintain a constant output.

FIG. 7 depicts the embodiment of FIG. 6B at FIG. 7A and an adjunct feedback control circuit per FIG. 7B including a microprocessor and look-up table for controlling operation of the system of FIG. 7A. In FIG. 7B, the output shaft 649, for example, may have its speed measured by a tachometer or other rotational speed sensor 710 which may provide a signal representative of output rotational speed to a microprocessor or other decision circuit 730. Alternatively, the input shaft 601 may be used for reading variable rotational velocity to control output shaft velocity at a constant. The magnitude of either an input shaft or an output shaft signal may be compared with a decision table in processor memory 720 for providing a value of eccentricity. The eccentricity value may be utilized, in turn, to drive an actuator represented by, for example, a servo motor for driving, for example, a worm/worm gear 653, 654 for adjusting eccentricity to achieve a constant output regardless of variable input. In the embodiment of FIG. 3, the right sun gear 322 may be actuated and moved to a rotational position according to the eccentricity value output of the memory decision table.

Figure 8:
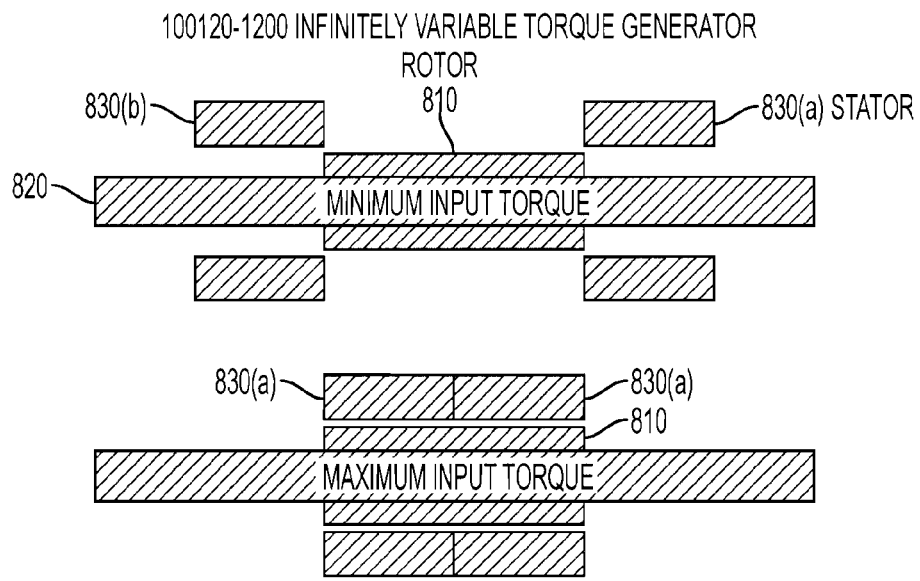
FIG. 8 depicts a cross-sectional view of an infinitely variable torque generator for controlling the torque on a rotor shaft as will be more fully depicted in FIG. 10.
Figure 10:
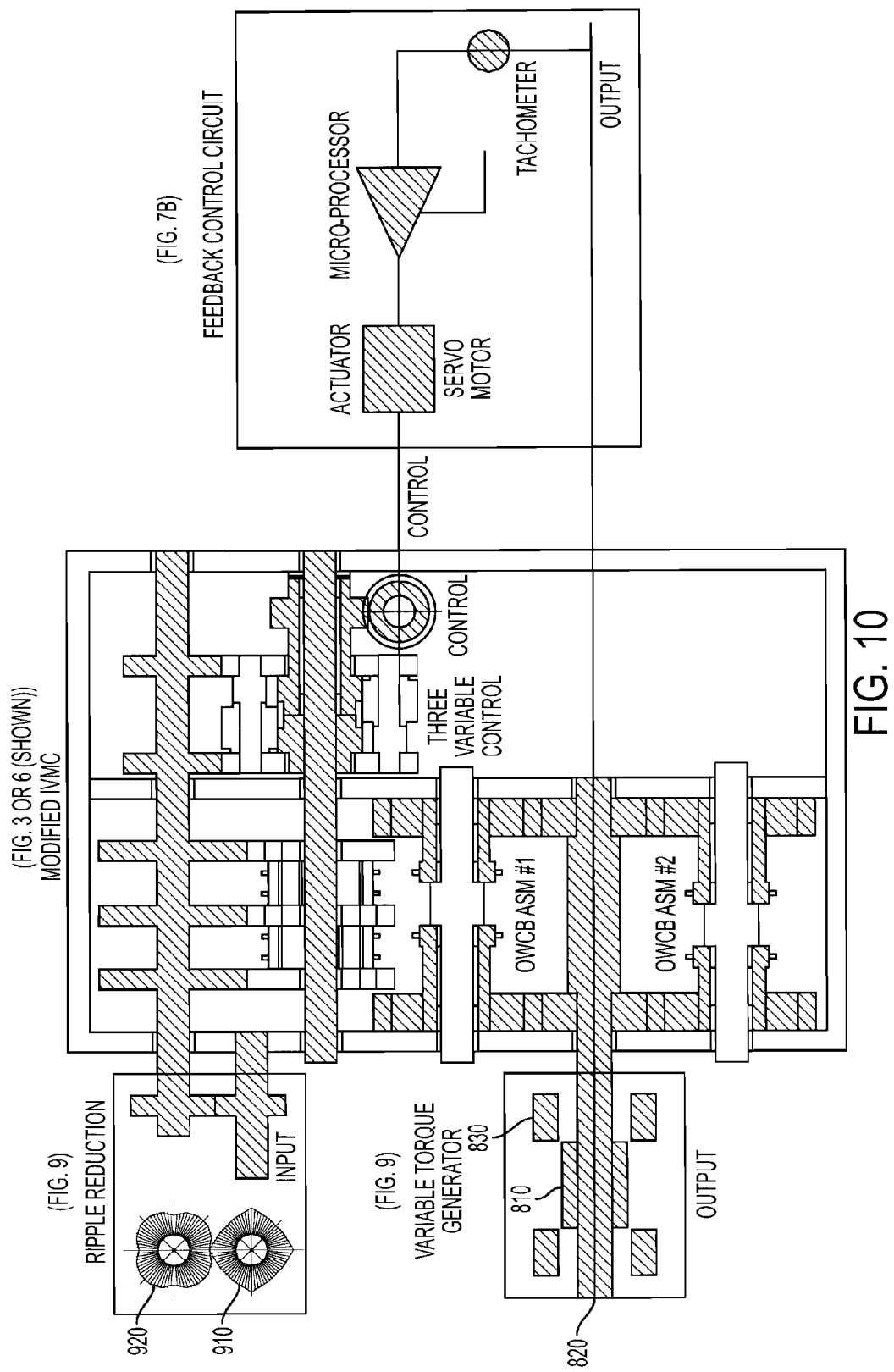
FIG. 10 depicts the system Of FIG. 6 (shown) or FIG. 3 with a feedback control circuit, an infinitely variable torque generator and a ripple reduction set of n-sided, non-circular gears indicated per FIGS. 7B, 8 and 9, respectively.

FIG. 8 depicts a cross-sectional view of an infinitely variable torque generator for controlling the torque on a rotor shaft as will be more fully depicted in FIG. 10. A generator driven by an output shaft of a variable input, constant output system may have a variable torque associated with it. Also, a rotor blade pitch control system may not react quickly enough to and abrupt change in fluid velocity and a resultant torque may exceed operating torque range of a rotor shaft. Brakes or turning off a generator may be a solution. However, there may be provided a further control for a rotor shaft by providing an axially slideable stator 830(a) which may be moved to the right and away from rotor 810 so as to reduce torque. There may be provided a further moveable stator 830(b) that may be moved axially to the left to reduce torque on the rotor 810 even further. When the stator parts 830(a) and 830(b) are moved in proximity to rotor 810, then, a maximum input torque is provided to rotor shaft 820. When the stator parts 830(a) and 830(b) are moved away from the rotor 810, a minimum input torque results. The operation of a control may be as follows via measuring a torque on shaft 820 with a torque meter (not shown). Upon reaching a torque value stored in memory proximate to the maximum torque that a given rotor shaft 820 may receive (a maximum allowable torque value), the stator parts 830(a) and (b) may be moved by a motor (not shown) to be in removed torque position or a position in between maximum and minimum torque positions whereby a close-to-maximum torque position may be achieved in relation to the measured torque and the maximum allowable torque value or value stored in memory. The location of the variable torque generator of FIG. 8 is shown with reference to FIG. 10.

Figure 9:
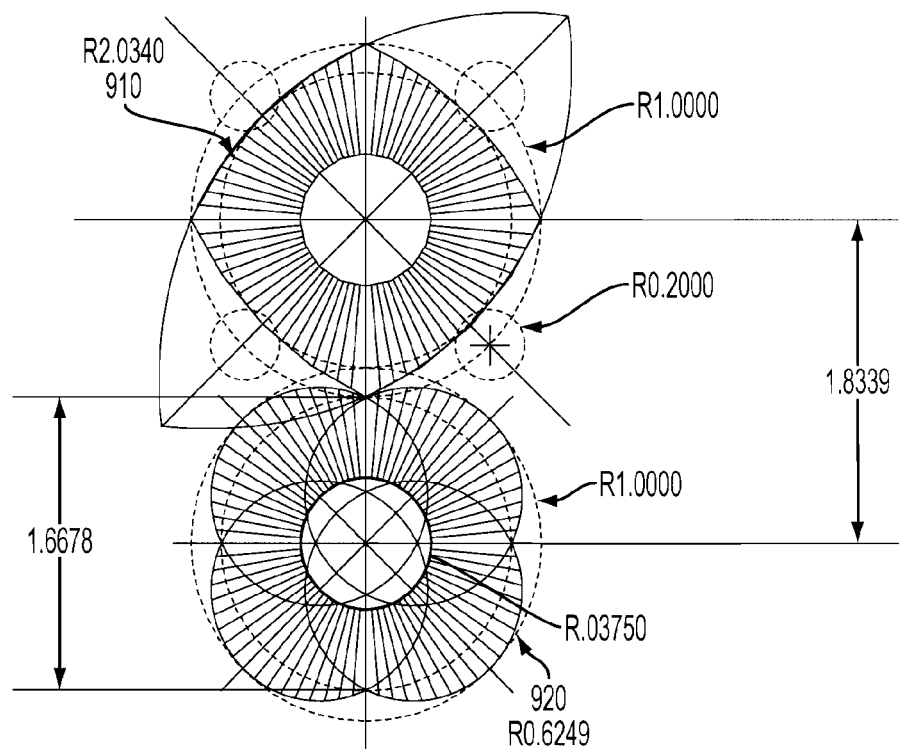
FIG. 9 depicts a pair of (n-sided, n leaves); for example, square and clover-leaf gears for controlling ripples in a four OWCB embodiment per FIG. 3 or FIG. 6 as will be more fully depleted in FIG. 10, where n is the number of OWCBs.

FIG. 9 depicts a system of non-circular, for example, square and clover-leaf gears for controlling ripples in the constant output for a four OWCB embodiment as will be more fully depicted in FIG. 10. If n is the number of OWCBs, then, non-circular, n-sided gears and clover-leaf gears with n leaves, may be used to reduce ripples in apparatus having n OWCBs. For example, the embodiments depicted in FIGS. 4, 9 and 10 of U.S. Pat. No. 7,731,616 are three OWCB embodiments and thus a triangular gear and three leaf clover, clover-leaf gear may be used with those embodiments. For five OWCBs, then, a five-sided or pentagon shaped gear may be provided and a five leaf clover gear and so on. The more OWCB's the more the multiple outputs are consolidated into one output by selecting the fastest speed around the race. The rippled output on an output shaft to a constant speed generator 250 (FIG. 2) may be smoothed by application of square (four-sided) gears 910 and (four leaf clover) cloverleaf gears 920 shown in FIG. 9 for a four OWCB system as per FIG. 3 or FIG. 6. The n-sided gears may be applied as may be seen in FIG. 10. A mechanical ripple smoothing of a sinusoidal output is achieved by the use of, for example, four-sided, non-circular gears, for example in the form of approximately square gears 910 or cloverleaf (four leaf clover) gears 920 coupled to OWCB assemblies 1 and 2 consisting of four OWCB's. These n-sided gears introduce a counterbalancing input and shape the output independent of the magnitude of the eccentricity provided by the control input. Consequently, ripple reduction output to the constant speed generator 250 may be achieved without adversely impacting the control aspects described above. The ripple reduction is thus accomplished as follows. When the properly matched rippled compensation input is synchronized with the cam positions, the ripples compensate the input so that constant output can be generated at all speeds. From a given rippled input, the amount of compensation varies as the eccentricity varies. Thus the compensating, non-circular, n-sided gears do not impact the setting of eccentricity value; eccentricity setting and ripple compensation work together to smooth the output.

FIG. 10 depicts the system of FIG. 6 (shown) or FIG. 3 with a feedback control circuit, a variable torque generator and a ripple reduction set of non-circular gears indicated per FIGS. 7B, 8 and 9 respectively.

The principles of application of the several discussed embodiments of a structure and method of constructing same for, for example, providing a green energy alternative to the burning of fuel such as coal, oil or other less environmentally friendly energy sources have been demonstrated above. The present embodiments used in conjunction with known flow energy turbine systems may be enhanced by using many known control systems for improved operation such as pitch and yaw control, control responsive to power grid statistics and requirements and remote or automatic control responsive to predicted and actual weather conditions (wind velocity from an anenometer, barometric reading and direction (rising or falling) and the like). These and other features of embodiments and aspects of a variable flow input, constant output system and method may come to mind from reading the above detailed description, and any claimed invention should be only deemed limited by the scope of the claims to follow.

What I claim is:

1. Variable flow input, constant rotational velocity output apparatus configured to rotate an electric generator via an output shaft for constant electric energy output wherein a variable flow rate input coupled to an input shaft is obtained by fluid flow, the apparatus configured to receive a variable rotational velocity input from a rotor, gearbox and input shaft assembly, the apparatus outputting the constant rotational velocity output at the output shaft to be equal to or exceed the variable rotational velocity input from the rotor, gearbox and input shaft assembly, the apparatus comprising:

an inner and outer cam assembly, the inner cam having a circular circumference and having a circular portion adapted for connection to an input shaft for receiving the variable rotational velocity input, the circular portion being off center from the circular circumference and being adapted to rotate within an outer cam having an inner circular aperture for receiving the inner cam, the inner circular portion being off center from an outer circumference of the outer cam such that the circular portion of the inner cam in one position is concentric with the outer circumference of the outer cam and is variable in position from concentric to eccentric, such that the circular portion is at a maximum distance from a drive portion of the outer cam at a maximum eccentric position, the variable output of the rotor and gearbox assembly being maintained at a constant by varying the eccentricity between minimum and maximum values related to cut-in and cut-out flow energy rates; and a one-way clutch bearing assembly for controlling output shaft motion in only one direction.

2. The variable flow input, constant rotational velocity output apparatus of claim 1 wherein the gearbox comprises speed increasing gears for multiplying the output of the rotor by a predetermined amount.

3. The variable flow input, constant rotational velocity output apparatus of claim 2 further wherein the gearbox of the rotor, gearbox and input shaft assembly multiplies the speed of rotation of a flow energy rotor by the predetermined amount.

4. The variable flow input, constant rotational velocity output apparatus of claim 1 further comprising a plurality of chains, drive sprockets and driven sprockets and race assemblies for multiplying the input speed by a variable amount at an output shaft for driving a generator rotor via a three variable controller.

5. The variable flow input, constant rotational velocity output apparatus of claim 1 further comprising a feedback control for adjusting eccentricity to achieve constant output, the feedback control comprising a tachometer for outputting an electrical signal proportional to the speed of one of the input shaft and the output shaft, a controller having a memory for outputting an eccentricity value responsive to the electrical signal.

6. The variable flow input, constant rotational velocity output apparatus of claim 5 wherein said feedback control circuit operates a worm and worm gear assembly.

7. The variable flow input, constant rotational velocity output apparatus of claim 5 wherein said feedback control circuit operates one of a sun gear and a carrier gear.

8. The variable flow input, constant rotational velocity output apparatus of claim 1 further comprising a slotted gear having a slot for nesting a cam pin of the outer cam.

9. The variable flow input, constant rotational velocity output apparatus of claim 8 further comprising a dual action driver driven by an inner and outer cam assembly.

10. The variable flow input, constant rotational velocity output apparatus of claim 1 further comprising a ripple reduction means comprising a non-circular, n-sided gear and a cloverleaf gear having a leaves coupled to the input for reducing ripples in the rotational velocity of the output shaft for an apparatus having n one-way clutch bearings, where n is the number of one-way clutch bearings.

11. The variable flow input, constant rotational velocity output apparatus of claim 1 further comprising a variable torque generator, the generator having a rotor, a rotor shaft integrally coupled to the rotor and an axially slideable stator whereby the stator is axially slideable from a torque position proximate the rotor to a torque position removed from the rotor.

12. The variable flow input, constant rotational velocity output apparatus of claim 1 wherein the variable flow input is provided by a wind energy source.

13. The variable flow input, constant rotational velocity output apparatus of claim 1 wherein the variable flow input is provided by a water energy source.

14. The variable flow input, constant rotational velocity output apparatus of claim 1 comprising three variable control to provide a constant output, the three variable control comprising a left sun gear, a plurality of planetary gears coupling the left sun gear to carrier gears, and a right sun gear.

15. A method of providing a constant electric energy output at an output shaft from a variable flow energy source coupled to an input shaft of a variable flow input, constant rotational velocity output apparatus, the method characterized by:

receiving a control input for varying a position of an inner cam in relation to an outer cam of the apparatus from a concentric position through varying degrees of eccentricity to an eccentric position, whereby the control input eccentricity level increases with increasing flow energy from a cut-in value to a cut-out value to maintain a constant rotational velocity output at the output shaft in relation to a varying rotational velocity input at the input shaft; and adjusting the torque of an associated rotor shaft by axially moving a stator in relation to a rotor of the rotor shaft, a movement of the stator away from the rotor reducing torque on the rotor shaft.

16. The method of claim 15 further comprising measuring the rotational velocity output of the output shaft for controlling the level of eccentricity.

17. The method of claim 15 further comprising measuring the rotational velocity input of the input shaft for controlling the level of eccentricity.

18. The method of claim 15 the control input eccentricity level comprising an output signal of a tachometer for outputting an electrical signal proportional to the speed of one of the input and the output shaft.

19. The method of claim 15 further comprising removing ripples from an output shaft rotational velocity by employing an n-sided gear and a cloverleaf gear having n leaves coupled to the input shaft where n is a number of one-way clutch bearings of the apparatus.

20. The method of claim 19 further comprising consolidating a plurality of outputs to one output, the OWCBs selecting the fastest speed as each OWCB rectifies one of the plurality of outputs.

21. The method of claim 19 wherein there are three one-way clutch bearings and the n-sided gear is a triangular gear and the cloverleaf gear has three leaves.

22. The method of claim 19 wherein there are four one-way clutch bearings and the n-sided gear is a square gear and the cloverleaf gear has four leaves.

23. The method of claim 15 further comprising multiplying the varying rotational velocity input by a predetermined speed ratio by decreasing the diameter of one of a one-way clutch bearing gear and a one-way clutch bearing sprocket of the apparatus.

* * * * *